(12) United States Patent
Günther et al.

(10) Patent No.: US 11,803,688 B2
(45) Date of Patent: Oct. 31, 2023

(54) SECONDARY DEVICE FOR A SENSOR AND/OR INFORMATION SYSTEM AND SENSOR AND/OR INFORMATION SYSTEM

(71) Applicant: Workaround GmbH, Munich (DE)

(72) Inventors: Paul Günther, Munich (DE); Vivek Soni, Munich (DE); Nico Adler, Munich (DE); Patrick Blitz, Munich (DE)

(73) Assignee: WORKAROUND GMBH, Munich (DE)

( * ) Notice: Subject to any disclaimer, the term of this patent is extended or adjusted under 35 U.S.C. 154(b) by 222 days.

(21) Appl. No.: 16/925,619

(22) Filed: Jul. 10, 2020

(65) Prior Publication Data

US 2021/0012055 A1 Jan. 14, 2021

(30) Foreign Application Priority Data

Jul. 12, 2019 (DE) ..................... 10 2019 118 965.9

(51) Int. Cl.
*G06F 40/103* (2020.01)
*G06F 40/186* (2020.01)
*H04W 4/80* (2018.01)

(52) U.S. Cl.
CPC .......... *G06F 40/103* (2020.01); *G06F 40/186* (2020.01); *H04W 4/80* (2018.02)

(58) Field of Classification Search
None
See application file for complete search history.

(56) References Cited

U.S. PATENT DOCUMENTS

| 6,268,853 | B1 * | 7/2001 | Hoskins | G05B 23/024 715/965 |
| 8,423,431 | B1 * | 4/2013 | Rouaix | G06Q 10/087 705/28 |

(Continued)

FOREIGN PATENT DOCUMENTS

WO 2017062621 A1 4/2017

OTHER PUBLICATIONS

U. Maurer, A. Rowe, A. Smailagic and D. P. Siewiorek, "eWatch: a wearable sensor and notification platform," International Workshop on Wearable and Implantable Body Sensor Networks (BSN'06), Cambridge, MA, USA, 2006, pp. 4 pp.-145, doi: 10.1109/BSN. 2006.24. (Year: 2006).*

(Continued)

*Primary Examiner* — William L Bashore
*Assistant Examiner* — Nathan K Shrewsbury
(74) *Attorney, Agent, or Firm* — Dilworth IP, LLC

(57) ABSTRACT

A secondary device for a sensor and/or information system, including a display and a control unit, is proposed. Predetermined interpretation instructions are stored in the control unit. The control unit is configured to wirelessly receive a display instruction containing at least one interpretation information and at least one text information. The control unit is configured to generate a graphic presentation containing the text information using the stored interpretation instructions on the basis of the interpretation information of the display instruction, and to display the graphic presentation by means of the display. Furthermore, a sensor and/or information system and a method of operating a sensor and/or information system are proposed.

20 Claims, 3 Drawing Sheets

(56) References Cited

U.S. PATENT DOCUMENTS

| | | | |
|---|---|---|---|
| 9,922,226 B1* | 3/2018 | Boyd | G06T 11/60 |
| 10,699,087 B1* | 6/2020 | Ozserin | G06K 7/10881 |
| 11,438,294 B2* | 9/2022 | Kalavagattu | H04L 67/565 |
| 2002/0051262 A1* | 5/2002 | Nuttall | G06V 30/1423 |
| | | | 358/537 |
| 2004/0073404 A1* | 4/2004 | Brooks | G05B 19/409 |
| | | | 702/183 |
| 2005/0060647 A1* | 3/2005 | Doan | G06F 16/248 |
| | | | 715/205 |
| 2006/0002528 A1* | 1/2006 | Nishiguchi | H04M 7/006 |
| | | | 379/93.25 |
| 2008/0134169 A1* | 6/2008 | Williams | G06F 8/61 |
| | | | 717/175 |
| 2008/0278778 A1* | 11/2008 | Saino | G06F 16/248 |
| | | | 358/505 |
| 2008/0300572 A1* | 12/2008 | Rankers | A61B 5/14532 |
| | | | 604/504 |
| 2009/0007188 A1* | 1/2009 | Omernick | G06F 3/04842 |
| | | | 725/62 |
| 2009/0273443 A1* | 11/2009 | Nilsson | G06F 3/147 |
| | | | 340/5.91 |
| 2009/0275306 A1* | 11/2009 | Kraft | H04H 60/74 |
| | | | 455/344 |
| 2010/0064228 A1* | 3/2010 | Tsern | G06F 3/04847 |
| | | | 715/740 |
| 2011/0193704 A1* | 8/2011 | Harper | A61B 5/14532 |
| | | | 340/573.1 |
| 2012/0004956 A1* | 1/2012 | Huston | G06Q 30/0241 |
| | | | 705/14.1 |
| 2012/0050781 A1* | 3/2012 | Morita | G03G 15/502 |
| | | | 358/1.13 |
| 2012/0190455 A1* | 7/2012 | Briggs | A63F 13/48 |
| | | | 463/42 |
| 2012/0287034 A1* | 11/2012 | Park | H04L 12/2809 |
| | | | 709/204 |
| 2012/0330109 A1* | 12/2012 | Tran | A61B 5/389 |
| | | | 600/509 |
| 2013/0240616 A1* | 9/2013 | Huang | G09G 5/22 |
| | | | 235/375 |
| 2014/0067426 A1* | 3/2014 | Neff | H04W 4/80 |
| | | | 705/3 |
| 2014/0121540 A1* | 5/2014 | Raskin | A61B 5/0077 |
| | | | 600/479 |
| 2014/0273858 A1* | 9/2014 | Panther | A61B 5/1123 |
| | | | 455/41.2 |
| 2014/0327630 A1* | 11/2014 | Burr | G06F 3/016 |
| | | | 345/173 |
| 2015/0089351 A1* | 3/2015 | Logan | G06F 40/103 |
| | | | 715/234 |
| 2015/0320314 A1* | 11/2015 | Berger | G06K 7/1417 |
| | | | 340/870.07 |
| 2016/0055246 A1* | 2/2016 | Marcin | G06F 16/903 |
| | | | 707/732 |
| 2016/0174025 A1* | 6/2016 | Chaudhri | H04B 1/385 |
| | | | 455/41.3 |
| 2016/0180136 A1* | 6/2016 | Meier | G06K 7/1473 |
| | | | 235/462.1 |
| 2016/0188181 A1* | 6/2016 | Smith | G06F 3/048 |
| | | | 715/765 |
| 2016/0267310 A1* | 9/2016 | AlNasser | G06F 1/1698 |
| 2016/0371371 A1* | 12/2016 | Chong | G06F 16/686 |
| 2017/0177290 A1* | 6/2017 | Dow | G09G 5/12 |
| 2017/0262678 A1* | 9/2017 | Lin | G06K 7/10891 |
| 2018/0113600 A1* | 4/2018 | Seymour | G06F 3/04847 |
| 2018/0157468 A1* | 6/2018 | Stachura | G06F 8/34 |
| 2019/0005098 A1* | 1/2019 | Frank | G06F 16/288 |
| 2019/0037086 A1* | 1/2019 | Tokuchi | H04N 1/00424 |
| 2019/0043302 A1* | 2/2019 | Lyons | G06T 15/08 |
| 2019/0109934 A1* | 4/2019 | Weinberg | G01C 21/3661 |
| 2019/0114941 A1* | 4/2019 | Shimaoka | G06F 3/167 |
| 2019/0132801 A1* | 5/2019 | Kamath | G16H 20/17 |
| 2019/0138273 A1* | 5/2019 | Brown | G06F 3/04845 |
| 2019/0166285 A1* | 5/2019 | Mistry | G06F 3/017 |
| 2019/0188781 A1* | 6/2019 | O'Brien | G06Q 30/0643 |
| 2019/0220134 A1* | 7/2019 | Sepulveda | G06F 3/0482 |
| 2019/0224528 A1* | 7/2019 | Omid-Zohoor | A61B 5/0024 |
| 2019/0287669 A1* | 9/2019 | Sun | G16H 10/60 |
| 2019/0332143 A1* | 10/2019 | Berardinelli | G06F 21/35 |
| 2020/0264764 A1* | 8/2020 | Seymour | G09B 21/008 |
| 2021/0012055 A1* | 1/2021 | Günther | H04W 4/38 |
| 2021/0014910 A1* | 1/2021 | Hutter | H04W 4/70 |

OTHER PUBLICATIONS

Zhuo, S.; Sherlock, L.; Dobbie, G.; Koh, Y.S.; Russello, G.; Lottridge, D. Real-time Smartphone Activity Classification Using Inertial Sensors—Recognition of Scrolling, Typing, and Watching Videos While Sitting or Walking. Sensors 2020, 20, 655. https://doi.org/10.3390/s20030655 (Year: 2020).*

A. S. Maner, D. Devasthale, V. Sonar and R. Krishnamurti, "Mobile AR System using QR Code as Marker for EHV Substation Operation Management," 2018 20th National Power Systems Conference (NPSC), Tiruchirappalli, India, 2018, pp. 1-5, doi: 10.1109/NPSC.2018.8771834. (Year: 2018).*

* cited by examiner

| (Header 1) | (Header 2) |
|---|---|
| (Text 1) | (Text 2) |
| (Header 3) | (Header 4) |
| (Text 3) | (Text 4) |

| Artikel | Stück |
|---|---|
| Wassermelone | 3 |
| Artikel | Kg |
| Bananen | 2 |

(HEADER 1)
1234567890123456789
(HEADER 2)
1234567890123456789
(HEADER 3)
1234567890123456789

| (HEADER 1) | (HEADER 2) |
|---|---|
| 123 | 12345678910234 |
| (HEADER 3) | (HEADER 4) |
| 123 | 12345678910234 |
| (HEADER 5) | (HEADER 6) |
| 123 | 12345678910234 |

| (HEADER 1) | (HEADER 2) |
|---|---|
| 12345678 | 12345678 |

(HEADER 3)
1234567890123456789
(HEADER 4)
1234567890123456789

(HEADER 1)

12345678

1234567890123456789

SECONDARY DEVICE FOR A SENSOR AND/OR INFORMATION SYSTEM AND SENSOR AND/OR INFORMATION SYSTEM

FIELD OF THE DISCLOSURE

The disclosure relates to a secondary device for a sensor and/or information system, to a sensor and/or information system, and to a method of operating a sensor and/or information system.

BACKGROUND

Systems having portable sensors, such as barcode scanners, or portable display units with screens are known. Such systems usually communicate with a main device that controls the flow of data to and from the sensors.

Information that is relevant to the user in connection with an activity performed by the user is usually displayed to the user in a graphical manner on the screen.

The problem is that the amount of data to be transmitted is usually relatively large for graphical presentations, which is why more time is needed for data transmission, which can cause time delays in the graphical presentation. In addition, large amounts of data that are transmitted wirelessly result in a high energy requirement, which reduces the battery life of portable devices.

SUMMARY

Thus, there is a need to provide a secondary device for a sensor and/or information system, a sensor and/or information system, and a method of operating a sensor and/or information system permitting fast data transmission.

The object is achieved according to the disclosure by a secondary device for a sensor and/or information system, including a display and a control unit. Predetermined interpretation instructions are stored in the control unit. The control unit is configured to wirelessly receive a display instruction containing at least one interpretation information and at least one text information. Furthermore, the control unit is configured to generate a graphic presentation containing the text information using the stored interpretation instructions on the basis of the interpretation information of the display instruction, and to display the graphic presentation by means of the display.

The disclosure is based on the basic idea that only the minimal information necessary for the generation of the graphic presentation is transmitted to the secondary device. The secondary device then generates the graphic presentation itself based on the predetermined interpretation instructions. Therefore, the graphic presentation itself is not transmitted to the secondary device, but only the display instruction, which only contains the absolutely necessary information for generating the graphic presentation. This considerably reduces the amount of data to be transmitted and thus the time needed for data transmission and data processing.

One aspect of the disclosure provides that the display instruction, in particular the interpretation information, is free from independent representations of graphical presentations. An "independent representation" is here and in the following understood to be a completed image or image section in any file format, for example any kind of pixel map, vector graphic etc. Accordingly, the display instruction does not contain any image information as such, but only text information that is interpreted by the secondary device to form an image based on the interpretation instructions. Since only text is transmitted, the amount of data to be transmitted is considerably reduced compared to images to be transmitted, which is why the data transmission and data processing also takes much less time.

According to a further embodiment of the disclosure, the control unit is an embedded system. Thus, no full operating system or the like runs on the control unit of the secondary device; rather, the control unit is configured to process received signals and data according to fixed rules or algorithms. Such embedded systems typically have much lower computing power and much smaller storage capacities than smart devices such as smart phones, tablets or laptops. The method of generating the graphic presentation described above is also suitable for such embedded systems because of the small amounts of data to be transmitted.

According to one embodiment of the disclosure, the interpretation instructions contain different templates which are each linked to an identifier, the interpretation information containing at least one identifier of one of the templates. In particular, the templates comprise instructions for the output of acoustic, optical and/or haptic signals.

For example, the interpretation information thus comprises the information "template #13" or only "13", which means that the template with the identifier "#13" is to be used for the graphic presentation of the message to be displayed.

Generally speaking, each template is a sample template comprising at least one or more of the following information: number of rows and/or columns of the graphic presentation; separation of individual cells by separating lines; font size in the individual cells; placement of headings; placement of the text to be displayed and/or graphical symbols and the arrangement thereof.

In addition, the templates may contain instructions for the secondary device to emit an acoustic signal. For example, the acoustic signal is a tone, a sequence of different tones or a melody. Information about the acoustic signal, such as a corresponding audio file in a suitable format or audio encoding, may be part of the template.

Alternatively or additionally, the templates may contain instructions for the secondary device to output an optical signal. In particular, the optical signal is a light, in particular a flashing light in one or more colors.

Alternatively or additionally, the templates may contain instructions for the secondary device to output a haptic signal. In particular, the haptic signal is a vibration of the secondary device.

Therefore, the graphic presentation of the template is not transmitted to the secondary device, but only the identifier of the template to be used in the form of a text and/or in coded form, for example in the form of binary coding. This further reduces the amount of data to be transmitted.

Likewise, the acoustic, optical and/or haptic signals themselves are not transmitted to the secondary device. Therefore, in the above example, the tone sequence is not transmitted as an audio file; rather, the tone sequence is already stored in the interpretation instructions in the secondary device. The same applies accordingly to the optical and/or haptic signals.

In particular, the at least one text information is or contains a character string. Here and in the following, a character string is understood to be a sequence of letters, numbers, spaces and/or special characters. The character string represents the text to be graphically displayed or part thereof. Examples of such character strings are "steel tubes" and "diameter: 15 cm".

If necessary, the text information also includes one or more character string identifiers which indicate whether the respective character string is a heading or normal text to be displayed.

Preferably, the control unit is configured to receive the text signal via a Bluetooth connection, in particular via a Bluetooth Low Energy connection. Bluetooth, in particular Bluetooth Low Energy, enables data to be exchanged in an energy-efficient manner, thus increasing the battery life at least of the secondary devices.

The object is further achieved, according to the disclosure, by a sensor and/or information system including a main device and a secondary device as described above. The main device is configured to generate and/or receive at least one message to be displayed, which is to be displayed on the secondary device. The main device is further configured to generate the display instruction including interpretation information and text information based on the message, and to send the display instruction wirelessly to the secondary device.

In other words, the main device, which generally has considerably higher computing power and/or a considerably larger memory than the secondary device, automatically selects an appropriate template suitable for presenting the message to be displayed based on specific characteristics of the message to be displayed.

The specific characteristics of the message to be displayed include at least one or more of the following: number of characters, number of words, number of headings and/or number of lines.

However, the display instruction generated by the main device, more precisely the interpretation information, only includes the template identifier mentioned above rather than the template itself. Accordingly, only the template identifier needs to be transmitted from the main device to the secondary device, which considerably reduces the amount of data to be transmitted and thus the time needed for data transmission and data processing.

The templates are stored on the secondary device along with unique identifiers as interpretation instructions before the sensor and/or information system is used, for example, when the secondary device is manufactured and/or when the secondary device is updated.

Alternatively or additionally, a user or administrator of the sensor and information system can generate templates from template components and transmit them to the secondary device.

Alternatively or additionally, a user can generate templates from template components and transmit them to the secondary device by means of an external computer system.

Incidentally, the characteristics and advantages of the secondary device described above also apply to the sensor and/or information system and vice versa.

One aspect of the disclosure provides that the sensor and/or information system comprises at least one article of clothing, in particular a glove or a wristband, the secondary device being fastened to the article of clothing, in particular being fastened and removed in a repeatable manner without tools. Accordingly, a user can wear the secondary device on the body, as a result of which it is always ready for use.

The main device may be a computer or a smart device. In particular, the main device can be a smart phone, a tablet, a laptop or even a stationary computer. Accordingly, the typical computing power and memory of such devices is available to the main device.

It is also conceivable that the main device is a server which can be accessed in particular via an Internet connection, i.e. a so-called cloud server.

Preferably, the main device generates the interpretation instruction, in particular the identifier of one of the templates, and/or the text information based on the characteristics of the secondary device, in particular the type, the location on the body, and/or the characteristics of the display of the secondary device. The main device in particular generates the interpretation instruction, in particular the identifier of one of the templates, and/or the text information based on a size of the display of the secondary device. For example, for different display sizes, a different template may be respectively more appropriate, which is taken into account by the main device when selecting the template. In particular, the message to be displayed only contains at least a heading and/or a text to be transmitted. An example of such a message to be displayed is: "Component: Plastic tube, diameter: 5 cm". In this example, "component" and "diameter" are the headings, and "plastic pipe" and "5 cm" constitute the text to be displayed which is respectively associated with one of the headings.

The object is further achieved according to the disclosure by a method of operating a sensor and/or information system, in particular for a sensor and/or information system as described above. The sensor and/or information system includes at least one main device and at least one secondary device with stored, predetermined interpretation instructions. The method comprises the following steps:

receiving or generating a message to be displayed by means of the main device, generating a display instruction based on the message to be displayed by means of the main device, wherein the display instruction contains at least one interpretation information and at least one text information, wirelessly transmitting the display instruction from the main device to the secondary device, generating a graphic presentation of the message using the stored interpretation instructions based on the interpretation information of the display instruction by means of the secondary device, the graphic presentation containing the text information, and displaying the graphic presentation on a display of the secondary device by means of the secondary device.

As to the advantages, reference is made to the above explanations regarding the sensor and/or information system, which also apply to the method of operating the sensor and/or information system.

In particular, the message contains at least a heading and/or a text to be transmitted. An example of such a message to be displayed is: "Component: plastic tube, diameter: 5 cm". In this example, "component" and "diameter" are the headings, and "plastic tube" and "5 cm" constitute the text to be displayed which is respectively associated with one of the headings.

Preferably, the display instruction is transmitted to the secondary device by means of a Bluetooth connection, in particular a Bluetooth Low Energy connection. Bluetooth, in particular Bluetooth Low Energy, enables data to be exchanged in an energy-efficient manner, thus increasing a battery life at least of the secondary devices.

One aspect of the disclosure provides that the predetermined interpretation instructions contain different templates each linked to an identifier, and that the interpretation information contains at least one identifier of one of the templates, in particular wherein the main device generates the interpretation instruction, in particular the identifier of one of the templates, and/or the text information based on the characteristics of the secondary device, in particular the type, the location on the body, and/or the characteristics of the display of the secondary device. In particular, the interpretation instruction, in particular the identifier of one of the templates, and/or the text information are generated based on a size of the display of the secondary device. For example, for different display sizes, a different template may be respectively more appropriate, which is taken into account by the main device when selecting the template.

The display instruction generated by the main device, more precisely the interpretation information, includes only the template identifier, not the template itself. Accordingly, only the template identifier needs to be transmitted from the main device to the secondary device, which considerably reduces the amount of data to be transmitted and thus also the time needed for data transmission and data processing.

According to one aspect of the disclosure, the following further steps are carried out: At least one template component is selected from several template components which are different from each other, the template components being stored on the main device and/or in a computer system. In particular, the at least one template component is selected based on a user input. A template is generated based on the at least one selected template component. An interpretation instruction is generated for the at least one secondary device based on the generated template. The interpretation instruction is transmitted to the at least one secondary device.

In other words, new templates, which generally consist of several template components, can thus be created by a user, e.g. an administrator, using the main device or the computer system, and can be transmitted to the secondary device. More precisely, the corresponding interpretation instructions which belong to the new template(s) are transmitted to the secondary device and are stored in the memory thereof.

In this way, a user, e.g. an administrator, can assemble a desired template from the various template components. The main device and/or the computer system then automatically create(s) the appropriate interpretation instructions for the secondary device.

The computer system is one or more computers, in particular servers, which can be connected to the main device.

A further aspect of the disclosure provides that the template is generated based on the characteristics of the at least one secondary device, in particular the type, location on the body, and/or the characteristics of the display of the secondary device, in particular a size of the display of the secondary device. In other words, the main device and/or the computer system automatically adapts the generated template to the respective secondary device. In particular, the main device generates the interpretation instruction, in particular the identifier of one of the templates, and/or the text information based on a size of the secondary display. For example, for different display sizes, a different template may be respectively more appropriate, which is taken into account by the main device when selecting the template.

BRIEF DESCRIPTION OF THE DRAWINGS

Further advantages and characteristics of the disclosure will become apparent from the description below and from the attached drawings to which reference is made and in which.

DETAILED DESCRIPTION

Lists having a plurality of alternatives connected by "and/or", for example "A, B and/or C" are to be understood to disclose an arbitrary combination of the alternatives, i.e. the lists are to be read as "A and/or B and/or C". The same holds true for listings with more than two items.

Figure 1:
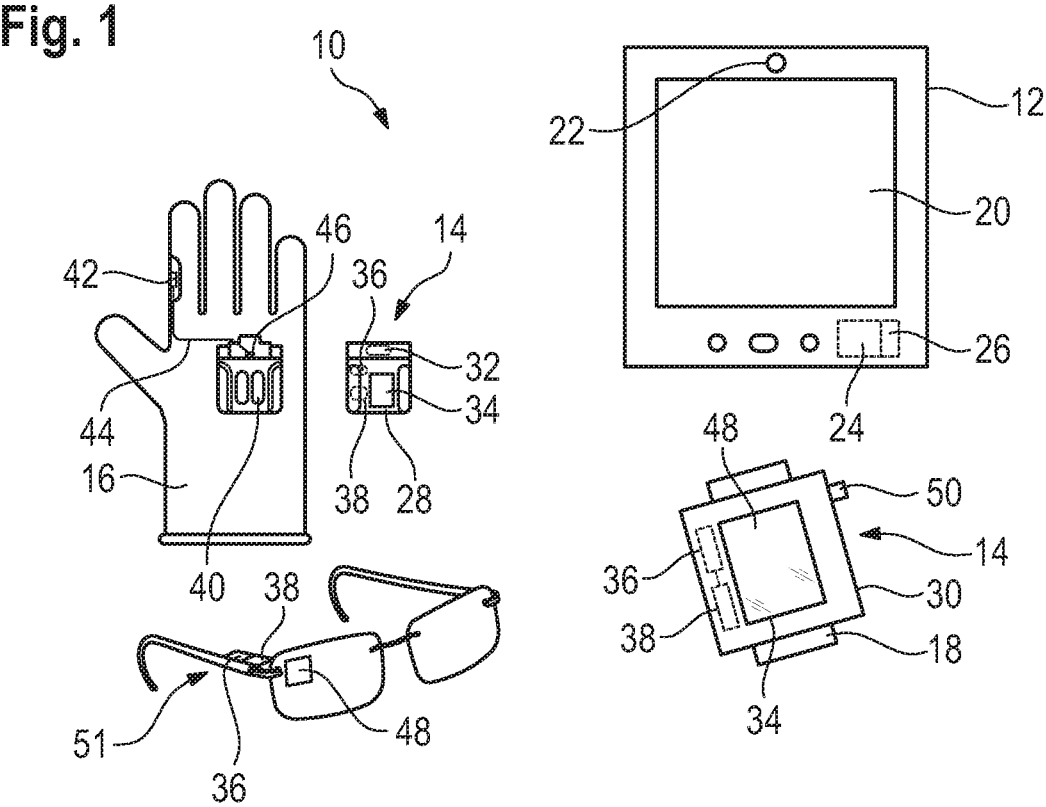
FIG. 1 shows a sensor and/or information system according to the disclosure in an unworn condition.

FIG. 1 schematically shows a sensor and/or information system 10 which has a main device 12 and two secondary devices 14 as well as articles of clothing, more precisely a glove 16 and a wristband 18.

The sensor and/or information system 10 is configured for industrial use and therefore has a corresponding robustness for continuous operation.

Figure 2:
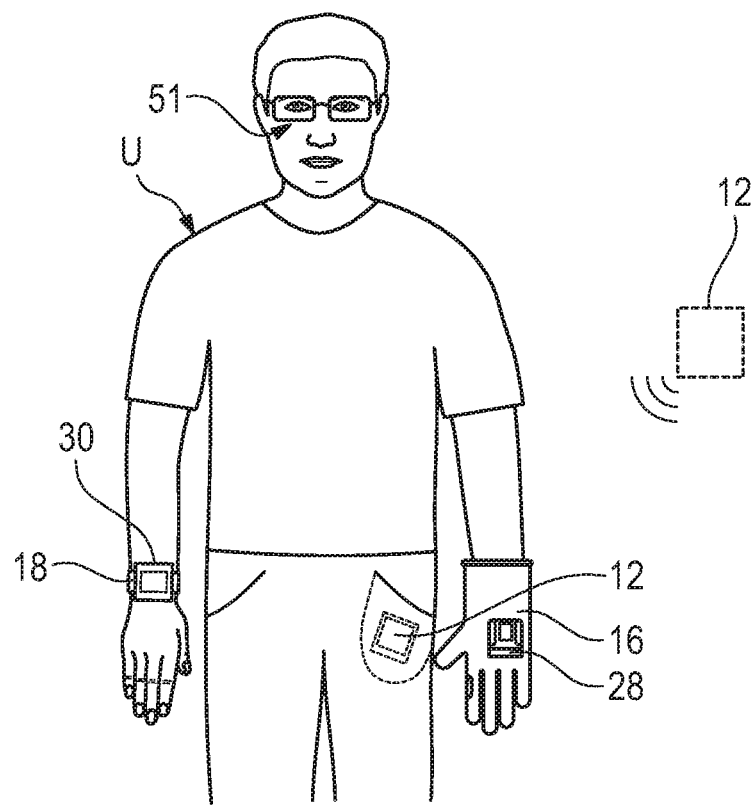
FIG. 2 shows the sensor and/or information system of FIG. 1 while worn by a user.

The main device 12 is a smart device, for example a smartphone, a tablet or even a laptop. Alternatively, the main device 12 can also be a stationary device, in particular a stationary computer. It is also possible to use a cloud server as main device 12. The mentioned stationary main devices 12 are shown in FIG. 2 as dashed lines.

The main device 12 has a display 20, a camera 22, and a control unit 24.

The control unit 24 has a communication module 26. The communication module 26 is, in general terms, configured to communicate wirelessly with the secondary devices 14.

For example, the communication module 26 is configured to communicate with the secondary devices 14 via Bluetooth, in particular Bluetooth Low Energy, and/or via WLAN.

The control unit 24 has an operating system on which an application of the sensor and/or information system 10 is executed.

In the example embodiment shown, the sensor and/or information system 10 has a first secondary device 14, which is a sensor module 28, and a second secondary device 14, which is a display module 30.

The sensor module 28 has an optical reading unit 32, which is a barcode scanner in the example embodiment shown, and a display 34 and a control unit 36 including a communication module 38.

The sensor module 28 has a battery or more precisely an accumulator for power supply.

It is also conceivable that the sensor module 28 has other sensors, such as an RFID reader, touch sensors or acceleration sensors in addition to or instead of the optical reading unit 32. The display module 30 can also include such sensors.

In general, the control unit 36 of the sensor module 28 has considerably lower computing power and considerably lower memory capacity than the control unit 24 of the main device 12.

In particular, the control unit 36 of the sensor module 28 is an embedded system. Thus, no complete operating system or similar is executed on the control unit 36 of the sensor module 28; rather, the control unit 36 is configured to process received signals and data according to fixed rules or algorithms.

The communication module 38 is configured to communicate wirelessly with the main device 12, more precisely with the communication module 26 of the main device 12, preferably via Bluetooth, in particular Bluetooth Low Energy, and/or via WLAN.

The sensor module 28 can be fastened to the body of a user U using the glove 16.

For this purpose, the glove 16 has a receptacle 40 in which the sensor module 28 can be fastened and removed in a repeatable manner without tools.

The glove 16 can also have an actuating element 42, for example a button for the secondary device 14.

By means of cables 44 and contact elements 46 in the receptacle 40, the actuating element 42 is connected to the secondary device 14 as soon as it is inserted in the receptacle 40.

The display module 30 has a display 48 and a control unit 36 including a communication module 38.

The display module 28 has a battery or more precisely an accumulator for power supply.

In general, the control unit 36 of the display module 30 has considerably less computing power and considerably less memory capacity than the control unit 24 of the main device 12.

In particular, the control unit 36 of the display module 30 is an embedded system. Thus, no operating system or similar runs on the control unit 36 of the display module 30; rather, the control unit 36 is configured to process received signals and data according to fixed rules.

The communication module 38 of the display module 30 is also configured to communicate wirelessly with the main device 12, more precisely with the communication module 26 of the main device 12, preferably via Bluetooth, in particular Bluetooth Low Energy, and/or via WLAN.

In addition, an actuating element 50 is provided on the display module 30 to actuate the display module 30.

The display module 30 can be fastened to the body of the user U by means of the wristband 18.

Alternatively or additionally, the sensor and/or information system can include at least one further secondary device 14, configured as smartglasses 51. In this case, the explanations as to the display module 30 also apply except for the attachment to the body by means of the wristband 18.

In the case of the smartglasses 51, "display" is then to be understood as an extended term, namely both as an self-illuminating screen in the area of the lenses and as a projection device which projects an image onto the lenses or directly onto the retina of the user U.

The secondary devices 14 are thus so-called "wearables".

FIG. 2 shows the user U wearing the sensor and/or information system 10.

The user U is, for example, an assembly worker in production or a logistics employee in a warehouse.

At the beginning of a shift, the user U and each of his colleagues take a main device 12 and secondary devices 14 corresponding to his task from the corresponding charging stations.

Figure 3:
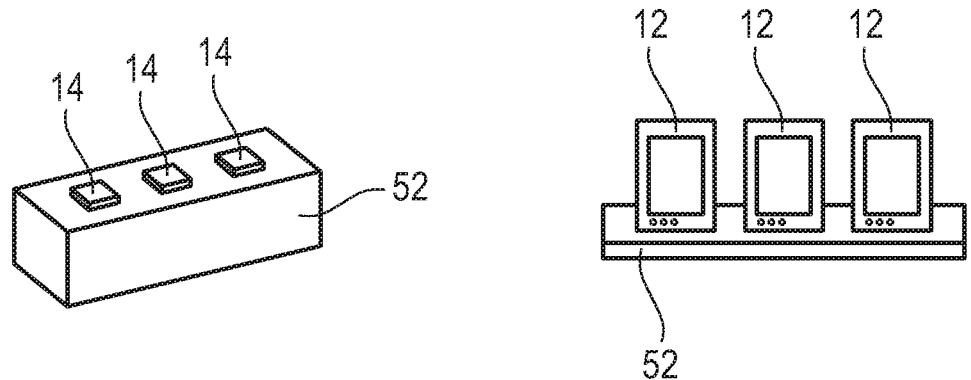
FIG. 3 shows main and secondary devices of sensor and/or information systems according to FIG. 1 in appropriate charging stations.

FIG. 3 shows charging stations 52 for secondary devices 14 and main devices 12, in which the main devices 12 and the secondary devices 14 are inserted for charging.

At the end of each shift at the latest, the user U puts the secondary devices 14 and the main device 12 back into the corresponding charging station 52.

In the charging station 52, the secondary devices 14 are not assigned to any of the main devices 12, so that the sensor and/or information systems 10 can be selected from any of the devices 12, 14. The user U can therefore take any main device 12 and any secondary devices 14 suitable for his task.

Figure 4:
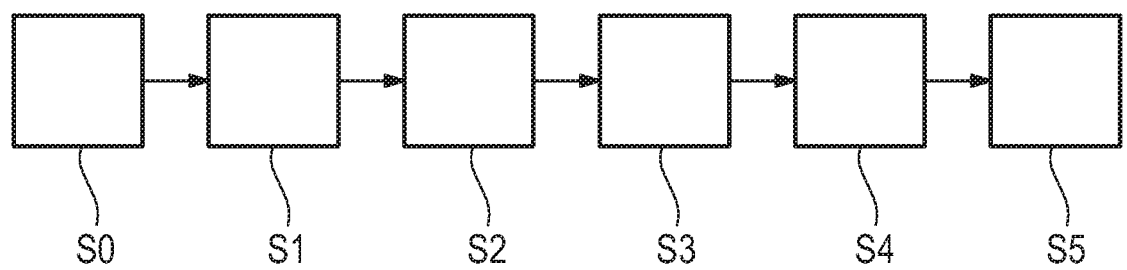
FIG. 4 shows a flow chart of a method according to the disclosure.

In order to display information to the user, the sensor and/or information system 10 is configured to perform the method described below with reference to FIG. 4.

In a preparatory step S0, templates are first defined and respectively stored with a unique identifier on the secondary devices 14 as interpretation instructions.

Generally speaking, each template is a sample template for a graphic presentation of information on the respective display 34, 48 of the secondary device 14 and any instructions for other measures, such as the output of optical, acoustic and/or haptic signals. A template contains at least one or more of the following information: the number of rows and/or columns of the graphic presentation; the separation of individual cells by separating lines; the font size in the individual cells; the placement of headings; the placement of the text to be displayed; and/or graphical symbols and the arrangement thereof.

Figures 5A, 5B, 6A, 6B, 6C, 6D:
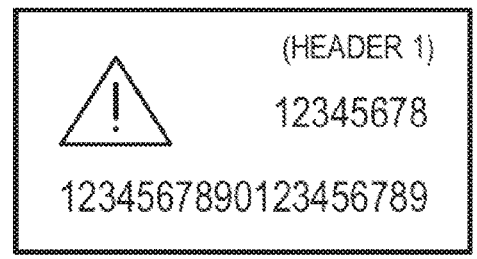
FIG. 5A shows an example of a template.
FIG. 5B shows the template of FIG. 5A with inserted text information.
FIGS. 6A to 6D show further examples of templates.

An example of such a template is shown in FIG. 5A. The template shown there comprises two rows and two columns, i.e. a total of four cells, each separated from each other by separating lines.

Each of the four cells respectively comprises a heading, namely (Header 1), (Header 2), (Header 3) or (Header 4), and a text to be displayed, namely (Text 1), (Text 2), (Text 3) or (Text 4). Further examples of templates are shown in FIGS. 6A to 6D, in which the wildcard characters for the text to be displayed are represented by number chains 12345 . . . .

The template of FIG. 6D also has a graphic symbol, in this case a warning triangle, which is placed at a specific position to give the user a quickly understandable hint. The headline and text are arranged appropriately around the symbol.

In addition, the templates can contain instructions for the secondary device 14 to emit an acoustic signal. For example, the acoustic signal may be a tone or a sequence of different tones, in particular a beep.

Alternatively or additionally, the templates may contain instructions for the secondary device 14 to output an optical signal. In particular, the optical signal is a light, in particular a flashing light in one or more colors.

Alternatively or additionally, the templates may contain instructions for the secondary device 14 to output a haptic signal. In particular, the haptic signal is a vibration of the secondary device 14.

For example, a template may contain the following combination of instructions to warn the user: emit a warning tone in the form of several beeps, emit a flashing red light and vibrate. This is purely exemplary. Depending on the situation, acoustic, optical and haptic signals can be combined as desired.

In addition, an identifier, in the simplest case in the form of a number, is assigned to each template.

The storage of the templates together with the identifiers on the secondary devices 14 takes place, for example, during the manufacture of the secondary devices 14 or subsequently by a user of the sensor and/or information system 10.

The selection of which templates are to be used by the secondary devices 14, i.e. which templates are to be stored on the secondary devices 14, can be made by a user, for example an administrator of the sensor and/or information system 10.

The user can for example select the templates from factory templates and/or create own templates which correspond to special cases of application in the user's operation.

To create an own template or to adapt a template, the user uses an editor software on the main device 12 or a separate computer system in which template components are stored.

Examples of template components are different symbols, such as a stop sign, one line of text including a heading, different tone sequences, such as warning tones, different vibration patterns, different light sequences of a light on the secondary device.

If the user wants to create a template for a warning message, for example, he selects a stop sign, one line of text, a warning tone, a concise vibration pattern and a rapid flashing of the light as template components. If necessary, he arranges the template components, in this case the stop sign and the line of text, according to his wishes.

The template is then generated from the selected template components and contains, in addition to a graphic presentation, the desired instructions for the output of acoustic, optical and haptic signals.

The interpretation instruction is then generated from the template specifically for the respective secondary device 14 on which the template is to be used. Among other things, a display size of the respective secondary device 14 is taken into account.

Accordingly, the interpretation instruction is adapted depending on whether the secondary device 14 is a sensor module 14, a display module 30 or smartglasses 51.

The user therefore does not have to worry about scaling and adaptation of the template to the various secondary devices 14, as the templates are automatically adapted by the editor software.

The interpretation instruction is then transmitted to the corresponding secondary device 14 and stored in the control unit thereof. The transmission can also take place wirelessly and during operation.

In this way, new templates can be created or existing templates can be adapted flexibly and at any time to meet the requirements of the respective operation.

In other words, new templates, which generally consist of several template components, can be created by the main device or by the computer system and be transmitted to the secondary unit. More precisely, the corresponding interpretation instructions belonging to the new template(s), including any audio files, are transmitted to the secondary device and stored in the control unit 36 thereof.

The computer system is one or more computers, in particular servers, which can be connected to the main device 12 for data exchange.

However, it is also conceivable that the templates are updated for updates of the secondary device 14, i.e. interpretation instructions belonging to new templates are stored in the secondary device 14 and/or interpretation instructions belonging to old templates are adapted or deleted.

Information about the characteristics of the templates is also stored in the main device 12, more precisely in the application, at least the identifier and information about how many headings and text can be displayed using the respective template. It is also conceivable that the complete templates are stored on the main device 12.

In the intended operation, a message to be displayed is generated or received by the main device 12 (step S1). For example, the main device 12 receives the message to be displayed from a warehouse database or similar.

The message to be displayed contains at least a heading and a text to be displayed. An example of such a message to be displayed would be the following message: "item: watermelon, number of pieces: 3; article: bananas, kg: 2". In this example, "articles", "number of pieces", "articles" and "kg" are the headings, and "watermelon", "3", "bananas" and "2" constitute the text to be displayed which is respectively associated with one of the headings.

Based on the generated or received message to be displayed, the main device 12 generates a display instruction containing at least one interpretation information and at least one text information (step S2).

The text information is one or more characters or character strings representing the text to be displayed. In the above example, the text information comprises the character strings "article", "watermelon", "number of pieces", "3", "article", "bananas", "kg" and "2".

If necessary, the text information also includes one or more character string identifiers which indicate whether the respective character string is a heading or normal text to be displayed.

In step S2, the main device 12 automatically selects an appropriate template suitable for displaying the message to be displayed based on specific characteristics of the message to be displayed.

The specific characteristics include at least one or more of the following: number of characters, number of words, number of headings and/or number of lines.

In addition, the main device 12 can also select the template based on which of the secondary devices 14 should display the message. For example, the display 48 of the display module 30 is generally larger than the display 34 of the sensor module 28, which is why a different template may be respectively better suited to display the same message on the two secondary devices 14.

The identifier forms at least part of the interpretation information of the display instruction. The interpretation information thus comprises the identifier of one of several different templates to be used for the graphic presentation of the message to be displayed. For example, the interpretation information thus includes the information "Template #34" or only "34", which means that the template with the identifier "#34" is to be used for the graphic presentation of the message to be displayed.

However, the display instruction generated by the main device 12, more precisely the interpretation information, only includes the template identifier mentioned above.

The interpretation information therefore does not include the template itself or even an independent graphic representation in the form of an image file of any format, for example as jpg, png etc. Therefore, the interpretation information does in particular not include the image shown in FIG. 5B.

In summary, the display instruction only contains the template identifier and the text information. The display instruction is free of independent representations of graphical presentations, which is why the amount of data to be transmitted is small. For example, the display instruction contains—in addition to necessary protocol information—only the following text: "34; article; watermelon; number of pieces; 3; article; bananas; kg; 2".

The display instruction is then transmitted wirelessly from the communication module 26 of the main device 12 to the communication module 38 of the sensor module 28 and/or to the communication module 38 of the display module 30 (step S3).

The control unit 36 of the secondary devices 14 receives the identifier of the template to be used along with the display instruction, so that it is unambiguously defined which template is to be used by the control unit 36 for the graphic presentation of the text information, and then generates a graphic presentation from the display instruction (step S4).

Due to the interpretation instruction, the control unit 36 knows how the text information is formatted and how it has to be interpreted.

In the example, for Template #34, the control unit 36 expects text information in the format (Header 1); (Text 1); (Header 2); (Text 2); (Header 3); (Text 3); (Header 4); (Text 4) so that the text information "article; watermelon; number of pieces; 3; article; bananas; kg; 2" is interpreted correctly.

Finally, the graphic presentation generated in step S4 is displayed on the display 34 or 48 (step S5).

As a result of step S5, the text information contained in the display instruction is therefore displayed on the display 34 or 48, in the template the identifier of which is contained in the display instruction. In the above example, FIG. 5B shows the result of step S5, i.e. the graphic presentation displayed on the display 34 or 48.

If the template, the identifier of which is contained in the display instruction, contains instructions for the secondary device 14 to output acoustic, haptic and/or optical signals, these are also output in addition to the presentation of the text information on the display 34 or 48.

FIG. 5B shows the template of FIG. 5A, in which the above-mentioned example of a message to be displayed is inserted, the headings and the text to be displayed being each entered into the appropriate wildcard characters (Header i) and (Text j) with i,j∈{1, 2, 3, 4}.

In this way, the user is now shown information in a suitable graphic presentation, the data required therefor, which had to be transmitted wirelessly, being however small. Accordingly, the computing power required on the secondary device is also low, so that simple secondary devices 14 can be used. In addition, a very long battery life is achieved for all devices 12, 14 due to the low data volume.

Furthermore, the creation and implementation of a template can be carried out independently of the secondary devices 14.

The invention claimed is:

1. A sensor module including a barcode scanner, a display, and a control unit housed together in the sensor module, wherein predetermined interpretation instructions are stored in the control unit and the control unit is configured to:
wirelessly receive a display instruction containing at least one interpretation information and at least one text information,
generate a graphic presentation containing the text information using the predetermined interpretation instructions on a basis of the interpretation information of the display instruction, and
display the graphic presentation by means of the display, wherein the predetermined interpretation instructions stored in the control unit contain different templates, wherein the interpretation information contains information allowing identification of one of the templates, wherein each of the different templates comprises at least one item of the following group: a number of rows and/or columns of the graphic presentation, a separation of individual cells by separating lines, a font size, a placement of headings, a placement of the text information to be displayed, a graphical symbol to be displayed, a placement of the graphical symbol to be displayed, or an arrangement of the graphical symbol to be displayed.

2. The sensor module according to claim 1, wherein the display instruction is free of independent representations of graphical presentations.

3. The sensor module according to claim 2, wherein the interpretation information is free of independent representations of graphical presentations.

4. The sensor module according to claim 1, wherein the control unit is an embedded system.

5. The sensor module according to claim 1, wherein the templates comprise instructions for an output of at least one of acoustic, optical and haptic signals.

6. The sensor module according to claim 1, wherein the at least one text information is or contains a character string.

7. The sensor module according to claim 1, wherein the control unit is configured to receive the display instruction via a Bluetooth connection.

8. A system including a main device and a secondary device, the secondary device being a sensor module,
the sensor module including a barcode scanner, a display, and a control unit housed together in the sensor module, wherein predetermined interpretation instructions are stored in the control unit and the control unit is configured to:
wirelessly receive a display instruction from the main device containing at least one interpretation information and at least one text information,
generate a graphic presentation containing the text information using the predetermined interpretation instructions on a basis of the interpretation information of the display instruction, and
display the graphic presentation by means of the display;
wherein the main device is configured to:
at least one of generate and receive at least one message to be displayed, which is to be displayed on the sensor module,
generate the display instruction with interpretation information and text information on a basis of the message, and
send the display instruction wirelessly to the sensor module,
wherein the predetermined interpretation instructions stored in the control unit contain different templates which are each linked to an identifier and the interpretation information contains at least one identifier of one of the templates, and wherein each of the different templates comprises at least one of a number of rows and/or columns of the graphic presentation, a separation of individual cells by separating lines, a font size, a placement of headings, or a placement of the text information to be displayed and/or graphical symbols and an arrangement thereof.

9. The system according to claim 8, wherein the system comprises at least one article of clothing, wherein the sensor module is fastened to the article of clothing.

10. The system according to claim 9, wherein the article of clothing is a glove or a wristband.

11. The system according to claim 8, wherein the main device is a computer or a smart device.

12. The system according to claim 8, wherein the main device generates at least one of the interpretation instructions and the text information based on characteristics of the sensor module.

13. The system according to claim 8, wherein the message to be displayed consists of contains at least one of a text and at least one heading to be transmitted.

14. A method of operating a system, the system including at least one main device and at least one sensor module with stored, predetermined interpretation instructions, the at least one sensor module including a barcode scanner and a display housed together in the sensor module, the method comprising the following steps:

receiving or generating a message to be displayed by means of the main device, generating by means of the main device a display instruction based on the message to be displayed, wherein the display instruction contains at least one interpretation information and at least one text information, wirelessly transmitting the display instruction from the main device to the sensor module, generating a graphic presentation of the message using the predetermined interpretation instructions based on the interpretation information of the display instruction by means of the sensor module, wherein the graphic presentation contains the text information, and displaying the graphic presentation on a display of the sensor module by means of the sensor module, wherein the predetermined interpretation instructions contain different templates which are each linked to an identifier and the interpretation information contains at least one identifier of one of the templates, and wherein each of the different templates comprises at least one of a number of rows and/or columns of the graphic presentation, a separation of individual cells by separating lines, a font size, a placement of headings, or a placement of the text information to be displayed and/or graphical symbols and an arrangement thereof.

15. The method according to claim 14, wherein the message contains at least one of a text and at least a heading to be transmitted.

16. The method according to claim 14, wherein the display instruction is transmitted to the sensor module by means of a Bluetooth connection.

17. The method according to claim 14, comprising the following steps:

selecting at least one template component from a plurality of template components different from each other, wherein the template components are at least one of stored on the main device and stored in a computer system;

generating a template based on the at least one selected template component;

generating an interpretation instruction for the at least one sensor module based on the generated template; and transmitting the interpretation instruction to the at least one sensor module.

18. The method according to claim 17, wherein the template is generated based on characteristics of the at least one sensor module.

19. The sensor module according to claim 1, wherein the display instruction is wirelessly received from a main device, wherein the main device is a computer or a smart device.

20. The sensor module according to claim 1, wherein the at least one interpretation information and the at least one text information of the display instruction are received from a same source.

\* \* \* \* \*